SAMPLING APPARATUS

Filed Aug. 14, 1950 4 Sheets-Sheet 1

INVENTOR
William H. Cherry
BY
ATTORNEY

INVENTOR
William H. Cherry
BY
ATTORNEY

Feb. 18, 1958 W. H. CHERRY 2,824,172

SAMPLING APPARATUS

Filed Aug. 14, 1950 4 Sheets-Sheet 3

INVENTOR
William H. Cherry
BY
ATTORNEY

Feb. 18, 1958 W. H. CHERRY 2,824,172

SAMPLING APPARATUS

Filed Aug. 14, 1950 4 Sheets-Sheet 4

INVENTOR
William H. Cherry
BY
ATTORNEY

United States Patent Office 2,824,172

Patented Feb. 18, 1958

2,824,172

SAMPLING APPARATUS

William H. Cherry, Princeton, N. J., assignor to Radio Corporation of America, a corporation of Delaware Application August 14, 1950, Serial No. 179,197

20 Claims. (Cl. 179—15)

This invention relates to sampling apparatus and in particular to sampling apparatus employing sampling waves other than a series of narrow pulses.

In the art of time division multiplexing several different channels of information are sampled respectively during successive time intervals and these samples are interleaved in a predetermined sequence at the transmitter. At the receiver the wave formed by these interleaved samples is applied to a distributor or sampler. The distributor reforms the samples and applies those samples corresponding to a given channel to one output and those corresponding to another channel to a separate output, etc. If, in accordance with well established principles, the samples are infinitely narrow and occur at a rate not exceeding twice the cut off frequency of the transmitting medium, no cross talk is introduced between them.

However, in practice, there are various reasons why the use of extremely narrow pulses is not desirable. In the first place, they must have extremely high amplitude in order to have sufficient power to perform the sampling operation satisfactorily.

In the second place, slight variations in phase introduce a large percentage of cross talk, and therefore a system employing narrow pulse sampling is highly susceptible to noise since noise can effectively change the position of these samples. Accordingly, in previous methods and apparatus employing relatively narrow pulses a compromise has been made between the amount of cross talk introduced when the pulses are widened and the increase in modulation power thus derived.

In the third place, the faithful reproduction of the narrow samples requires too much bandwidth.

In accordance with this invention, however, it becomes possible to employ widened samples of different information channels in such manner as to effectively simulate the operation of narrow pulse sampling but without the attendant difficulties noted above. This process can be carried out at both the transmitter and the receiver.

Briefly, this objective can be obtained in the following manner. A sampling carrier, which may take the form of a series of pulses having any desired shape or which may take the form of a sine wave, is modulated or multiplied in a modulator or sampler with continuous signals that vary in amplitude in accordance with an intelligence to be transmitted. Selected harmonics of the sampling carrier can be modulated with the intelligence to be transmitted and the products thus produced combined with the products produced by the above-mentioned modulation of the fundamental.

If a suitable portion of the intelligence bearing signal is bypassed around the modulator or sampler, the output is the same as that which would be produced by narrow pulse sampling for all practical purposes. The particular polarity of the bypassed intelligence bearing signal depends upon the type of multiplier or modulator employed.

In accordance with another feature of this invention, the equipment required in a receiver of time division multiplexed information can be greatly simplified. Briefly, this may be accomplished by choosing sampling pulses of such shape and having such a D. C. component as to simplify the construction of the receiver whether or not this particular shape or D. C. component selected produces a satisfactory simulation of narrow pulse sampling by itself. The errors introduced by this sampling technique are compensated for by employing suitable sampling pulses at the transmitter. The required relationship between the sampling pulses at the receiver and those at the transmitter will be explained in detail hereafter. Generally speaking, in order to simulate narrow pulse sampling, it is necessary to provide extra circuitry in the receiver. It is possible, in accordance with one aspect of this invention, to obviate this requirement by suitably controlling the sampling operations at the transmitter as well as at the receiver.

The manner in which the above advantages may be derived will be more clearly understood from a detailed consideration of the drawings in which.

The sampling process or time division multiplexing process can be regarded as one in which a sampling carrier is modulated or multiplied by the intelligence bearing signal. Therefore, the terms modulating, multiplying and sampling are considered to be equivalent.

The Fourier analysis of a series of uniformly spaced narrow pulses such as discussed above yields the result $$(a) \qquad 1+2\cos\omega_s t+2\cos 2\omega_s t+\ldots$$

Therefore, if V represents the intelligence bearing signals and samples of this signal are taken in accordance with the above discussed time division multiplexing principles, the sampled output may be represented by the multiplication of V and the Expression (*a*) which is $$(b) \qquad V(1+2\cos\omega_s t+2\cos 2\omega_s t+\ldots)$$

In order to simulate narrow pulse sampling, therefore, the end products must be such as represented by the Expression *b*. It will be noted in this connection that the multiplication by the D. C. term of Expression *a* with the signal V produces the signal V itself, and that the amplitude of this signal is one half the amplitude of the product obtained when the A. C. terms of the Expression *a* are multiplied by the intelligence bearing signal V. The products produced by multiplication by the D. C. component of the sampling carrier will hereinafter be referred to as the D. C. product, and the products produced by the multiplication of the A. C. component of the carrier will be termed the A. C. product. Therefore, as long as the overall sampling process both at the transmitter and the receiver retains this two-to-one relationship between the amplitudes of the A. C. components and the D. C. components, the sampling process will be practically the same as the sampling process employing narrow pulses.

Figure 1A:
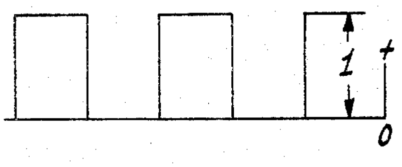
Figure 1A shows a typical sampling carrier wave.
Figure 1:
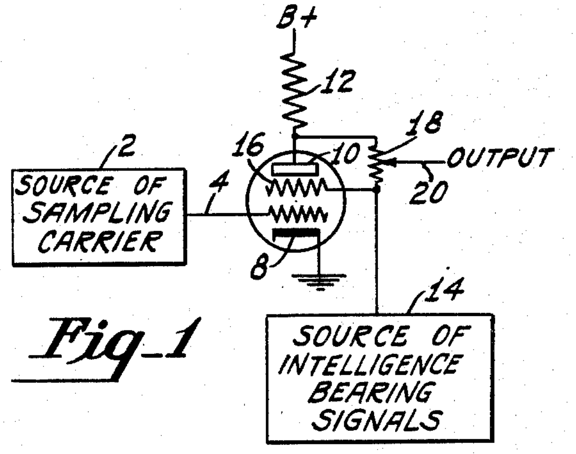
Figure 1 shows a type of modulator or multiplier in which the bypassed signals are opposite in polarity to the signals passing through the sampler.

A very effective and simple way of obtaining control over the ratio between the A. C. and D. C. products is illustrated in Figure 1. A source 2 of a sampling carrier which may be any continuous wave including square waves as shown in Figure 1A or sine waves is connected to a control grid 4 of an amplifier 6. The cathode 8 of the amplifier 6 is connected to ground and the plate 10 is connected to a suitable source of B+ potential via a load which may take the form of a resistor 12. The intelligence bearing signals are provided by a source 14 and are applied to another grid 16. One end of a potentiometer 18 having a movable contact 20 is also connected to the grid 16 and the other end of the potentiometer 18 is connected to the plate 10.

This circuit operates as follows. The sampling carrier is effectively multiplied by or modulated with the signals emanating from the source 14 and the products of this multiplication appear at the plate 10. Now if the source of the intelligence bearing signals 14 has a low impedance, then most of the voltage representing the products of multiplication will appear across the potentiometer 18. It will be noted that the intelligence bearing signals provided by the source 14 are inverted in polarity by the amplifier 6 and applied to the upper end of the potentiometer 18. Therefore, by positioning the movable arm 20 at a proper point the desired amount of intelligence bearing signal may be supplied to the output along with the products of multiplication. In other words, the potentiometer 18 and the movable contact 20 associated therewith provides a simple means of adjusting a value of the first term of V, in the Expression *b*. The movement of the arm 20, however, does not affect to the same extent the products of multiplication such as represented by V2 cos $\omega_s t$, as illustrated in the second term of the Expression *b*. In this way, the intelligence bearing signals are both passed through the sampler and bypassed around it.

Figure 2:
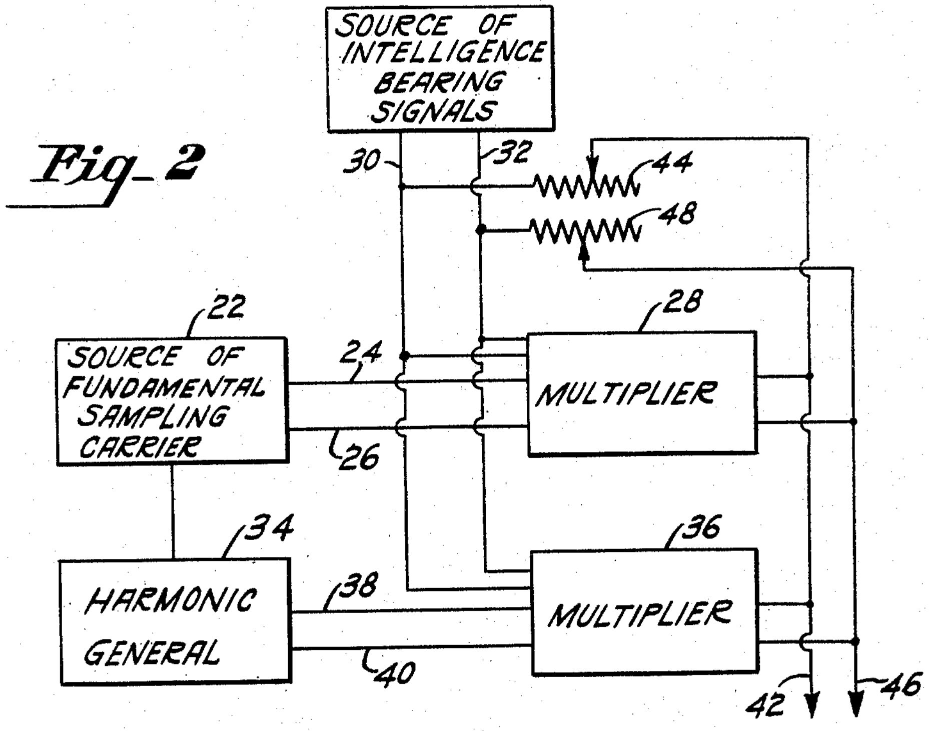
Figure 2 illustrates an apparatus wherein both the fundamental of the sampling carrier and one of its harmonics are multiplied or modulated with the intelligence bearing signal. In this particular arrangement the intelligence bearing signal is bypassed around the multipliers or samplers in such polarity as to be in phase with the signals provided by the samplers.

Figure 2 illustrates an apparatus wherein harmonics of the sampling carrier may be employed if desired. Reference to the Expression *a* shows that the sampling carrier has a second harmonic content of the same amplitude as the fundamental. Therefore, the ratio of its amplitude to the D. C. component of the sampling carrier must also be two-to-one if narrow pulse sampling is to be more exactly simulated. Whether or not the harmonics of the sampling carrier are employed depends upon the particular system in which the sampling operation is to take place, upon the number of intelligence bearing signals to be multiplied, and also upon the cut off frequency of the transmission medium being employed.

The fundamental sampling carrier is provided by a source 22 via double ended output leads 24 and 26 to a multiplier or modulator 28. The intelligence bearing signal is also applied to the modulator or multiplier 28 via double ended output leads 30 and 32. An harmonic of the sampling carrier is supplied from the harmonic generator 34 to a multiplier or modulator 36 by the double ended output circuit comprising leads 38 and 40. In order to insure that the harmonic supplied by the generator 34 will bear a constant phase relationship to the sampling carrier provided by the source 22, the generator 34 is coupled to the source 22 in a manner well known to those skilled in the art. The leads 30 and 32 carrying the intelligence bearing signal are also connected to the multiplier 36. Varying amounts of the intelligence bearing signal appear on the lead 30 and are supplied to a modulator output lead 42 via a potentiometer 44. In a similar fashion, a desired amount of the intelligence bearing signal appearing on lead 32 is placed on the modulator output lead 46 by a potentiometer 48. The signal thus bypassed by the potentiometers 44 and 48 may be the same as or opposite to the polarity of the signals produced by the multiplication of the D. C. component of the carrier and the intelligence bearing signals.

Figure 3:
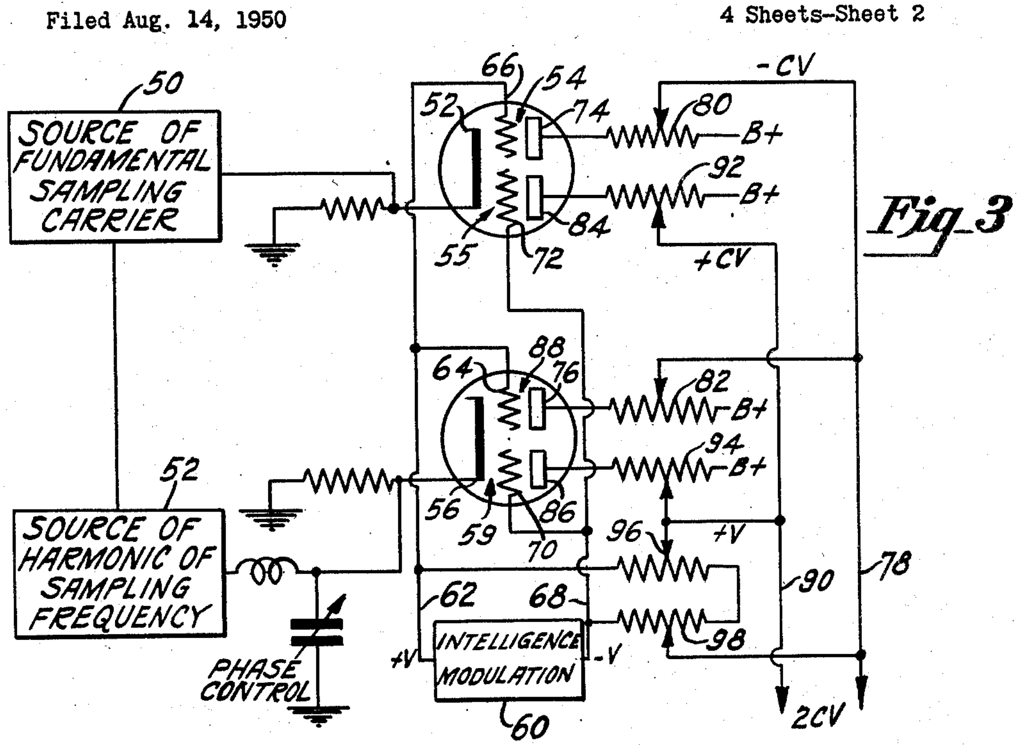
Figure 3 illustrates one form of multiplier that may be employed in the apparatus shown in Figure 2.

Whereas any type multipliers may be employed in the apparatus of Figure 2, Figure 3 illustrates in detail one type of multiplier or modulator that is satisfactory. The sampling carrier is provided by a source 50 and its harmonic is provided by a source 52. The sampling carrier is applied to a cathode 53 that is common to triode amplifiers 54 and 55. The harmonic of the sampling carrier is applied to a cathode 56 that is common to amplifiers 58 and 59. In this particular case, it will be noted that the outputs of the sources 50 and 52 are single ended. Here again, the harmonic may be derived from the sampling carrier itself in a manner well known to those skilled in the art. One of these double ended outputs 62 of a source 60 of intelligence bearing signals is connected to a grid 64 of the triode 58 and also to a grid 66 of the triode 54. The other output lead 68 of the intelligence signal source 60 is connected to grids 70 and 72 that form a part of the other triodes 59 and 55 respectively. The plate 74 of the triode 54 and the plate 76 of the triode 58 are connected to an output lead 78 via potentiometers 80 and 82, respectively. The plate 84 of the amplifier 55 and the plate 86 of the amplifier 59 are connected to the opposite output lead 90 via potentiometers 92 and 94 respectively.

The intelligence bearing signal is bypassed around the samplers or multiplying tubes by potentiometers 96 and 98 that are connected in series between the output leads 62 and 68 of the source 60. The movable tap of the potentiometer 96 is connected to the output lead 90 and the movable tap of the potentiometer 98 is connected to the other output lead 78.

The operation of the apparatus shown in Figure 3 is as follows. Assume that the instantaneous polarity of the intelligence bearing signal in lead 62 is positive as indicated by +V and that the lead 68 is relatively negative as indicated by −V. C represents the instantaneous amplitude of the sampling carrier. Under these conditions, the output at the potentiometer 80 in the non-linear amplifier 54 is $(kC-CV)$ where $k$ is constant, or the product of the carrier supplied by the source 50 and the intelligence bearing signal plus an amplified sampling carrier. This signal is then, as previously stated, applied to the output lead 78. On the other hand, the potentiometer 92 supplies a $(kC+CV)$ signal product to the output lead 90. In a similar way, the second harmonic of the sampling carrier that is supplied by the source 52 and the intelligence bearing signal are multiplied, and the product is supplied to the output leads 78 and 90, respectively. The bypassed intelligence bearing signal V in this particular instance is supplied by potentiometers 96 and 98 such that its positive output is connected to the output lead 90 and its negative output is connected to the output lead 78. Thus, it has the same polarity as the product signals $+CV$ and $-CV$ that are supplied by the potentiometers 92 and 80 respectively to these same leads. The terms $kC$ mentioned above thus disappear from the double ended output.

It will be apparent that if the amplitude of the sampling carrier should become zero, that some of the intelligence bearing signals supplied by the source 60 will appear in the output of the potentiometers 80 and 92 respectively. As a practical matter, however, this can be overcome by making the amplitude of the sampling carrier large in comparison with the intelligence bearing signal. In this way, no D. C. component is introduced except by the bypass arrangement of the potentiometers 96 and 98.

Figure 4:
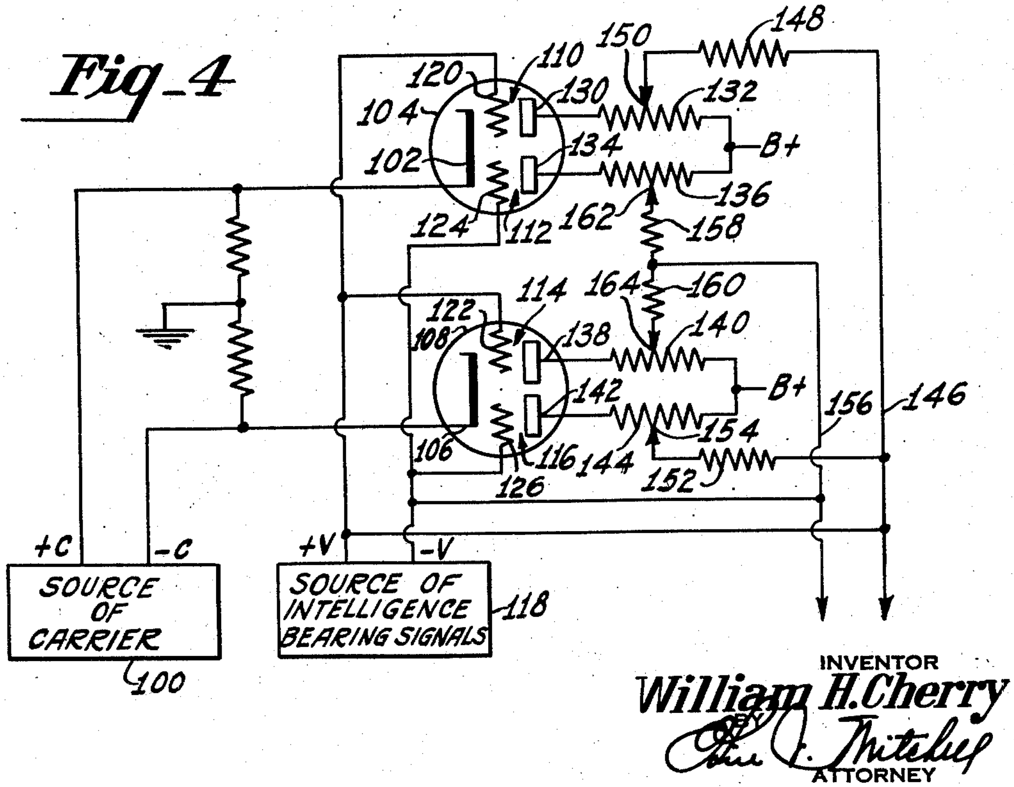
Figure 4 illustrates a type of double balanced modulator or multiplier that may be used in the arrangement of Figure 2.

Figure 4 illustrates a doubly balanced modulator which prevents either of the signals being multiplied or modulated from appearing by themselves in the output circuits. In this particular circuit, therefore, the relative amplitudes of the sampling carrier and the intelligence bearing signals need not be controlled for the purposes indicated immediately above in connection with Figure 3. The details of the circuit are as follows. The source of the sampling carrier 100 has a double ended output. The positive output is connected to a cathode 102 of a tube 104 and the negative output is connected to a cathode 106 of a tube 108. The cathode 102 is common to amplifiers 110 and 112 contained within the envelope 104. The cathode 106 is common to amplifiers 114 and 116 that are contained within the envelope 108. The intelligence bearing signal is supplied by a source 118 having a double ended output. The positive output lead is connected to a grid 120 of the amplifier 110 and also to the grid 122 of the amplifier 114. The negative output of the source 118 is connected to a grid 124 of the amplifier 112 and also to a grid 126 of the amplifier 116. The plate 130 of the amplifier 110 is connected to a suitable B+ potential via a potentiometer 132. The plate 134 of the amplifier 112 is connected to a suitable B+ potential via a potentiometer 136. The plate 138 of the amplifier 114 is connected to a source of B+ potential via a potentiometer 140 and the plate 142 of the amplifier 116 is connected to a source of B+ potential via potentiometer 144. An output lead 146 is connected via suitable isolating resistor 148 to a movable arm 150 of the potentiometer 132. The output lead 146 is also connected via an isolating resistor 152 to movable arm 154 of the potentiometer 144. The other output lead 156 of the modulator is connected via suitable isolating resistors 158 and 160 respectively to the movable arms 162 and 164 of the respective potentiometers 136 and 140. The positive output terminal of the source of intelligence bearing signals 118 is connected to the modulator output lead 146 and the negative output lead of the source 118 is connected to the modulator output lead 156, thus forming means for bypassing the intelligence bearing signal.

The circuit shown in Figure 4 may be substituted for one of the multipliers shown in Figure 3. The products produced by the multiplication of the carrier with the intelligence bearing signal will appear in leads 146 and 156. Neither the carrier alone nor the intelligence bearing signal alone will appear in these leads due to the double balancing action of the modulator. This is readily apparent from observation of the letters indicating the use of each of the four amplifiers on the drawing. It is therefore felt that no further explanation is necessary.

Figure 5:
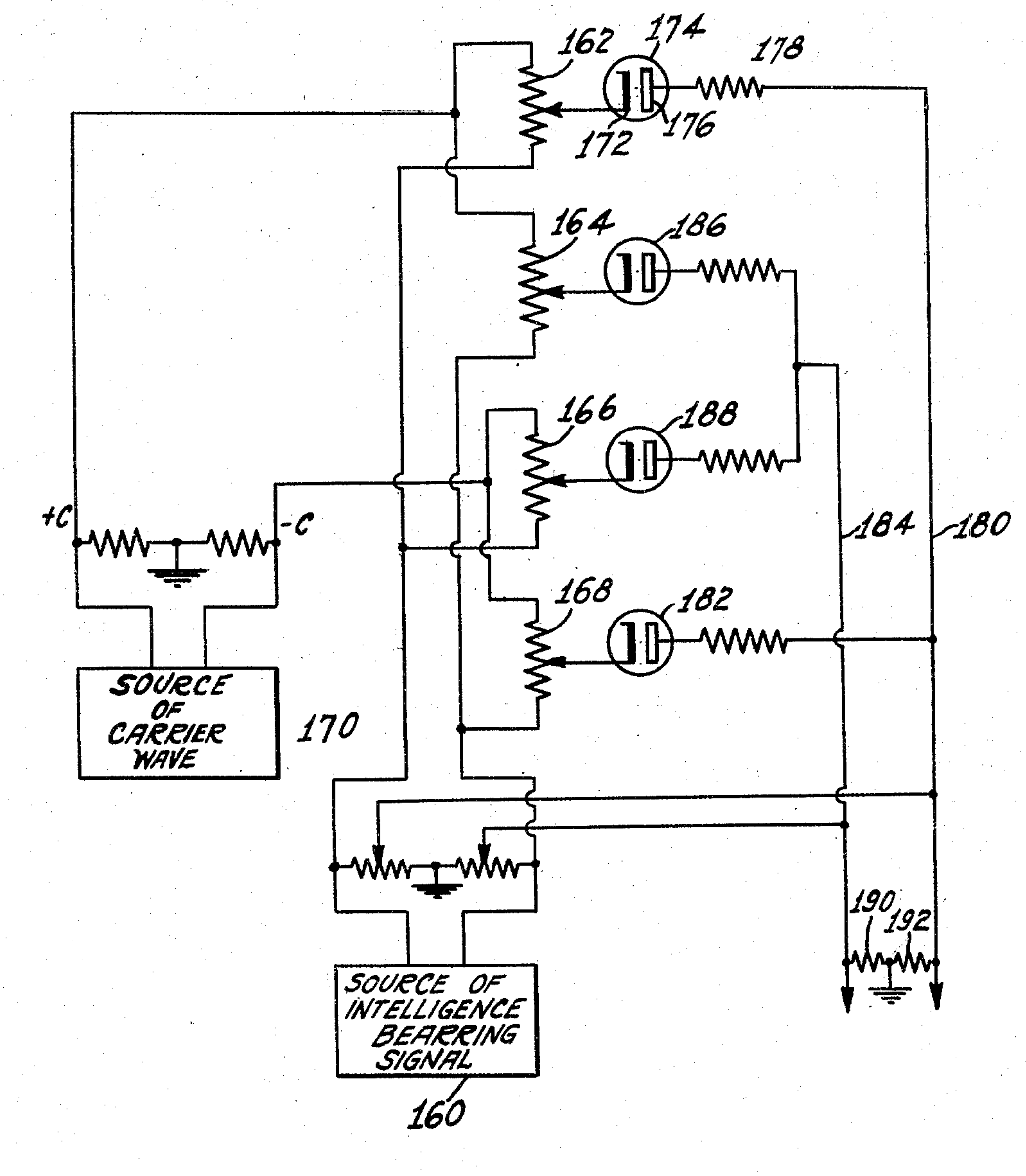
Figure 5 illustrates another type of double balanced modulator that may be employed in the arrangement of Figure 2.

Figure 5 illustrates another type of doubly balanced modulator employing unilateral current conducting devices. In this circuit the intelligence bearing signals are supplied by a source 160 for a double ended output, the polarities of which are indicated by +V and −V respectively. Potentiometers 162 and 164 are connected in series between the +V lead and the −V lead. Another pair of potentiometers 166 and 168 are connected in series between the +V lead and −V lead so that they are in effect in parallel with the source 160 and the potentiometers 162 and 164. The sampling carrier is supplied by a source 170 having a double ended output. The positive output indicated by +C is connected to the junction between the potentiometers 162 and 164. The negative output of the source 170 indicated by the −C is connected to the junction of the potentiometers 166 and 168.

A cathode 172 of a diode 174 is connected to the movable contact of the potentiometer 162. The plate 176 of the diode 174 is connected through a suitable isolating resistor 178 to an output lead 180. In a similar way, a diode 182 is connected between the movable tap of the potentiometer 168 and the output lead 180. The other modulator output lead 184 is connected to the movable tap of the potentiometer 164 via a diode 186 as shown and also to the movable tap of the potentiometer 166 via a diode 188 as shown. A means for bypassing the intelligence bearing signal around the modulator is provided by connecting the +V output lead of the source 160 to the modulator output lead 184. The load across which the double ended output is provided by the resistors 190 and 192. Their junction is connected to ground in the usual fashion.

The operation of the double balanced modulator immediately described above in connection with Figure 5 is similar to the operation of the apparatus of Figure 4 wherein the diodes are the non-linear elements which perform the multiplication that is performed by the amplifiers of Figure 4. Of course, due consideration must be given to the fact that the diodes do not amplify.

Figures 6, 7:
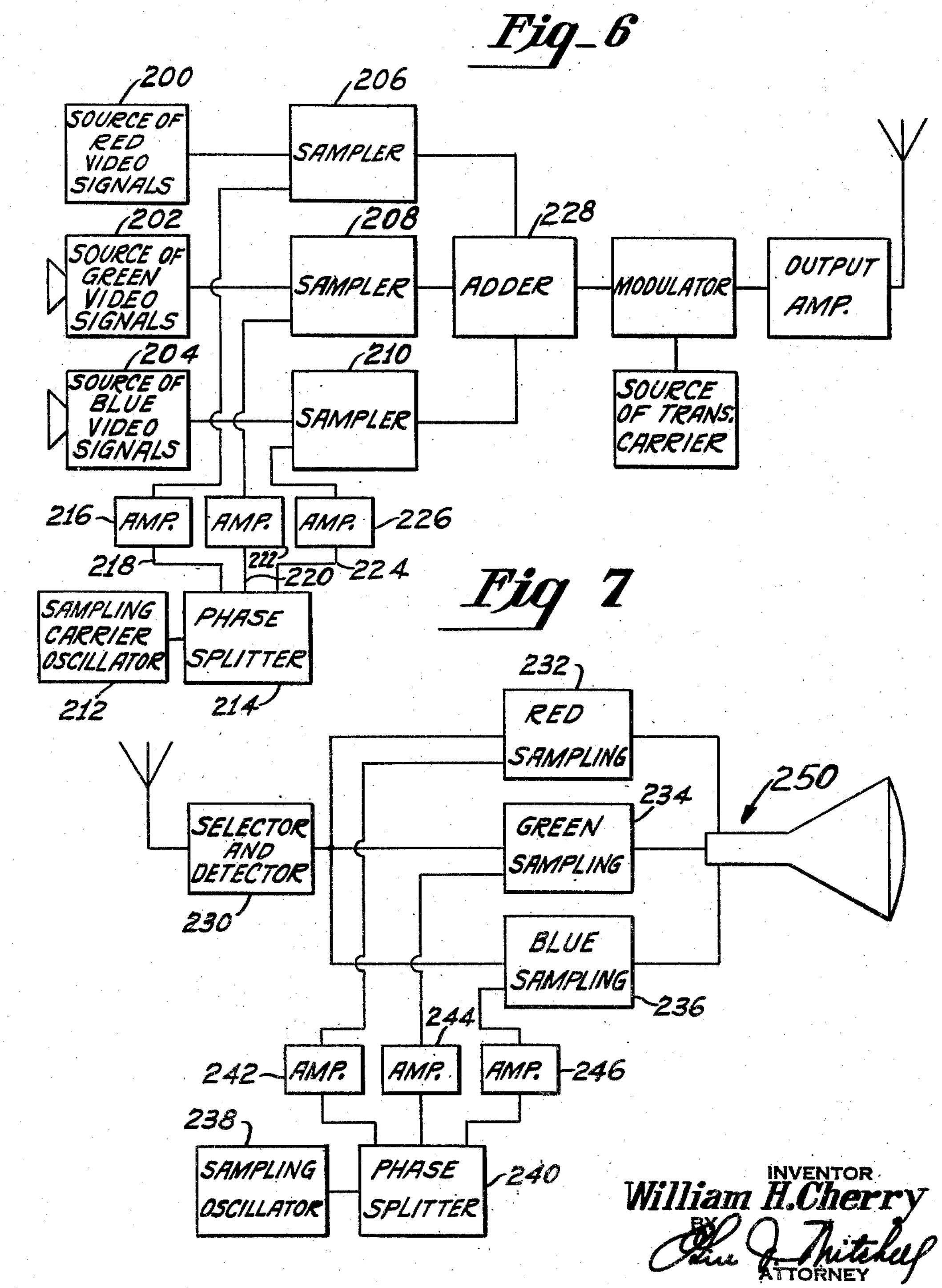
Figure 6 illustrates by block diagram how the apparatus of this invention would be incorporated into the structure of the color television transmitter.
Figure 7 illustrates by block diagram how the apparatus of this invention may be incorporated into a color television receiver.

Figure 6 illustrates how this invention may be incorporated into a color television transmitter of the dot multiplex type. Such a system is essentially a three channel time division multiplexing system, although this invention can be applied to the time division multiplexing of any number of separate intelligence signals. In this particular arrangement the red video signals are supplied by a camera 200, the green video signals by a camera 202, and the blue video signals by a camera 204 to the samplers 206, 208 and 210 respectively. The samplers may take any of the forms discussed above. For example, as indicated for the red sampler 206, these samplers may be in the form shown in Figure 1. The sampling carrier is provided by a source 212 to a phase splitter 214 having three separate outputs. The sampling frequency appearing in each of these outputs differs in phase from the sampling frequency appearing in the other outputs. After being suitably amplified in an amplifier 216 the sampling carrier in the output lead 218 is supplied to the sampler 206. The sampling carrier in the output lead 220 is amplified in the amplifier 222 and applied to the sampler 208. The sampling carrier appearing in the output lead 224 is amplified in an amplifier 226 and applied to the sampler 210. The outputs of the samplers 206, 208 and 210 are illustrated by a single line. It is not the intent of this diagram to show whether the inputs or the outputs of the samplers are single ended or double ended, but only to illustrate the paths that the signals follow. It is well within the skill of those trained in the art to combine the signals in the manner called for regardless whether they are single ended or double ended. The outputs of the samplers 206, 208 and 210 are combined in an adder 228. The output of the adder 228 is employed to modulate the carrier in the usual fashion and details need not be further explained.

Figure 7 illustrates how the samplers or multipliers illustrated above may be employed in a color television receiver adapted to cooperate with the color television transmitter discussed in connection with Figure 6 immediately above. The transmitted carrier wave is received and its modulation detected by the selector and detector indicated by the numeral 230. The detected output is applied to a red sampler 232, a green sampler 234, and a blue sampler 236. The sampling carrier is supplied by an oscillator 238. The phase and frequency of this sampling carrier may be maintained in step with the sampling carrier provided by the sampling oscillator 212 in the transmitter shown in Figure 6 by various means. However, inasmuch as these synchronizing means are not the subject of this invention, they have not been illustrated. The sampling carrier provided by the oscillator 238 is supplied in different phases by the phase splitter 240 to the amplifiers 242, 244 and 246. The amplifier 242 is connected to the red sampler 232, the amplifier 244 is connected to the green sampler 234, and the amplifier 246 is connected to the blue sampler 236. The outputs of the various samplers are applied to an apparatus adapted to reproduce colored images from signals representing the intensity variations of the three component colors. Such an apparatus is only schematically indicated by the numeral 250, as the details of this are not necessary to the understanding of the present invention. It will be understood that the samplers 232, 234 and 236 may be the same as any of those previously discussed. For example, as indicated for the red sampler 232, these samplers may be in the form shown in Figure 1. Here again, the input and output leads are not intended to indicate whether the input and output circuits are single ended or double ended.

In the first part of the specification mention was made of the fact that it was not necessary to simulate narrow pulse sampling both at the transmitter and at the receiver. The important fact is to simulate the overall characteristics produced when narrow pulse sampling is used at both the transmitter and receiver. In one form of the invention it is necessary that only the sampling wave or train of sampling pulses in the transmitter be related to that in the receiver such that the ratio of the product of the amplitude of the fundamental sampling frequency in the transmitter and the amplitude of the fundamental sampling frequency in the receiver to the product of the direct current component of this sampling wave at the transmitter and the direct current component of the sampling wave at the receiver have the value 4. To give a particularly useful application of this invention in this form, it may be noted that for reasons of economy and facility, and to reduce the interlace dot pattern in horizontally interlaced multiplex color television, it is advantageous to use an all positive, square wave gate sampling process in the receiver. Such a train of sampling pulses (height unity) has, as is well known, the Fourier cosine series expansion $$\tfrac{1}{2}+\sum_{n=1}^{n=\infty}\frac{\sin\frac{n\pi}{2}}{\frac{n\pi}{2}}\cos n2\pi vt=\tfrac{1}{2}+\frac{2}{\pi}[\cos 2\pi vt-\tfrac{1}{3}\cos 6\pi vt+\tfrac{1}{5}\cos 10\pi vt-\cdots]$$

Now for example, suppose that the transmitter sampling wave consists of a direct current and a cosine wave, in accordance with this invention: $1+b\cos 2\pi vt$, where $b$ is the fundamental sampling frequency amplitude effective after whatever modulation gain that arises has been taken into account. Hence, the transmitter-receiver fundamental frequency amplitude product has the proportional value $$\frac{2b}{\pi}$$

where the D. C. product has the proportional value ½. In order for the ratio of these two to have the optimum value, 4, $b$ must have the value $\pi$. Thus, in the transmitter sampling wave the ratio of fundamental amplitude to D. C. is $\pi$. Incidentally, it is to be remarked that if the gated pulses formed as above from the receiver sampling wave are applied and stored directly on the kinescope, in virtue of the fact that there is no second harmonic in this sampling wave, all spurious beat frequencies appearing in the picture will be in excess of the second harmonic frequency and may be presumed invisible.

Having described my invention, what is claimed is:

1. A sampler comprising in combination a first balanced modulator and a second balanced modulator, circuitry adapted to apply a carrier wave to said modulators in such a manner that it is balanced out in the output of each balanced modulator, means for applying signals bearing intelligence to each of said balanced modulators in reciprocal fashion, an output circuit connected to the outputs of said balanced modulators, a bypassing circuit connected between said means for applying the intelligence bearing signals to said balance modulators and said output circuit whereby said signals are bypassed around said first and second balanced modulators, and means for establishing the relative gains of said modulators and of said bypassing circuit so that the alternating current components appearing at the output circuit have twice the amplitude of the direct current components appearing at said output circuit.

2. A sampler comprising in combination a first double ended input having a positive and a negative side adapted to receive carrier waves, a second double ended input having a positive and a negative side adapted to receive a signal representative of a given intelligence, a first resistor connected between the positive side of said first double ended input and the positive side of said second double ended input, a second resistor connected between the positive side of said first double ended input and the negative side of said second double ended input, a third resistor connected between the negative side of said first double ended input and the positive side of said second double ended input, and a fourth resistor connected between the negative side of said first input circuit and the negative side of said second input circuit, a double ended output circuit having a first and a second side, a first unilateral current conducting device connected between an intermediate point on said first resistor and the first side of said double ended output circuit, a second unilateral current conducting device connected between an intermediate point of said second resistor and the second side of said double ended output circuit, a third unilateral current conducting device connected between an intermediate point on said third resistor and the second side of said double ended output circuit, a fourth unilateral current conducting device connected between an intermediate point of said fourth resistor and the first side of said double ended output circuit, connections between the positive side of said second double ended input circuit and one side of said double ended output circuit, and connections between the negative side of said second double ended input circuit and the other side of said double ended output circuit.

3. A sampler comprising in combination a first modulator and a second modulator, a source of intelligence bearing signals, an input circuit adapted to apply a signal to be sampled to each of said modulators, means for applying a given carrier frequency to said first modulator, circuits adapted to apply an harmonic of said carrier frequency to said second modulator, an output circuit connected so as to receive the products of modulation supplied by said first and second modulators, and bypass connections between said input circuit and said output circuit so as to bypass said modulators.

4. A sampler as described in claim 3 in which means are provided for controlling the relative amplitudes of the signals carried by said bypass connections.

5. A sampler comprising in combination, a first modulator having first and second inputs, a second modulator having first and second inputs, a source of carrier frequency connected to the first input of said first modulator, a source of an harmonic of said carrier frequency connected to the first input of said second modulator, the second inputs of said first and second modulators being connected together, an output circuit connected to receive the products of modulation supplied by said first and second modulators, and a bypass circuit connected between said second inputs and said output circuit.

6. A sampler comprising in combination a first balanced modulator having first and second inputs and an output, a second balanced modulator having first and second inputs and an output, a source of carrier frequency connected to the first input of said first balanced modulator, a source of an harmonic of said carrier frequency connected to the first input of said second modulator, and bypass circuits connected between said second inputs and said outputs.

7. Apparatus for time division multiplexing a plurality of intelligence bearing signals comprising in combination a plurality of sources of intelligence bearing signals, a plurality of modulators, each of said modulators having first and second inputs and an output, a generator of phase displaced voltage waves of carrier frequency, means coupling said generator to the first inputs of said respective modulators to apply each differently phased voltage wave provided by said generator to a first input of a different modulator, each of said second inputs being connected to a different source of signals, means for combining the outputs of all of said modulators with said intelligence bearing signals, means bypassing said modulators for coupling the output of each source of signals to said combining means, and means for establishing the gain of each of said modulators and the gain of said coupling means in such manner that the alternating current components produced by the modulators in response to a given intelligence bearing signal have twice the amplitude of the direct current components supplied to the said combining means both by said modulators and by said coupling means.

8. Apparatus for separating time division multiplexed signals from a composite wave comprising in combination a plurality of modulators, each of said modulators having first and second inputs and an output, a generator of phase displaced carrier waves of a desired frequency, means coupling said generator to the first inputs of said respective modulators for applying each of said differently phased carrier waves to the first input of a different modulator, means adapted to apply said composite wave to each of the second inputs of said modulators, said modulators being equipped with direct current component bypass circuits connected between said second inputs and the output of the corresponding modulator, and means for establishing the relative gains of each of said modulators and its bypassing circuit in such manner that the alternating current components appearing at the output of each of said modulators is twice the amplitude of the direct current components appearing at the output of said modulator.

9. Apparatus for simulating the transmission of an intelligence signal by sharp pulse sampling techniques comprising in combination a source of a carrier wave having predetermined direct current components and predetermined alternating current components, an amplitude modulator having first and second inputs, means for coupling said first input to said source of the carrier wave, a source of the intelligence signal, means for coupling the latter source to said second input, an output circuit coupled to said modulator, means for deriving a signal corresponding to said intelligence signal, means for coupling the corresponding signal to said output circuit around said modulator, and means for controlling the relative amplitudes of the signals passing through said coupling means and said amplitude modulator in such manner that the amplitude of the alternating current component produced by the modulator in response to a given intelligence signal is twice the amplitude of the direct current components of the intelligence signal reaching the output circuit whether such direct current components arrive at the output via the coupling means or through the modulator.

10. Apparatus for simulating the transmission of an intelligence signal by sharp pulse sampling techniques comprising in combination a source of intelligence signal, a source of a carrier wave having predetermined direct current components and predetermined alternating current components, an amplitude modulator having a first input to which a carrier wave to be modulated may be applied, a second input to which the intelligence signal may be applied and an output circuit, a circuit for coupling the carrier wave provided by said latter source to said first input and a circuit for coupling the intelligence signal provided by the first mentioned source to said second input, a modulator bypass channel connected between the source of the intelligence signal and said output circuit so as to couple said intelligence signal to the output of said modulator, and means for controlling the relative amplitude of the signals passing through said bypass channel and said amplitude modulator in such manner that the amplitude of the alternating current component produced by the modulator in response to a given intelligence signal is twice the amplitude of the direct current components of the intelligence signal reaching the output circuit of the modulator whether such direct current components arrive at the output via the bypass channel or through the modulator.

11. A modulator comprising in combination means adapted to receive a carrier wave, means adapted to receive an intelligence bearing wave, means for modulating the carrier wave with the intelligence bearing wave, an output terminal coupled to the output of said modulator, means coupled between the means for receiving the intelligence bearing wave and said output terminal for bypassing the intelligence bearing wave around said modulating means, and means for establishing the relative gains of the modulating means and the bypassing means in such manner that the alternating current components produced by the modulating means in response to the intelligence signal have twice the amplitude of the intelligence bearing wave as it appears at the output terminal.

12. A modulator comprising in combination means adapted to receive a carrier wave, means for generating one or more selected harmonics thereof, means adapted to receive an intelligence bearing wave, means for modulating said carrier wave with said intelligence bearing wave, means for modulating each of said selected harmonics with said intelligence bearing wave, an output terminal coupled to the output of said modulators, and means for bypassing the intelligence bearing wave provided by said third mentioned means around all said modulating means to said output terminal.

13. An apparatus adapted to modulate a continuous exclusively positive carrier wave comprised of relatively broad pulses with an information bearing signal in such manner that the products of modulation are similar to those produced when a series of uniformly spaced infinitely narrow pulses are modulated with the same signal comprising in combination an electron discharge device having a plate, two grids and a cathode, means for connecting said plate to a source of fixed potential via a load impedance, a potentiometer having an input connection and a movable contact, said potentiometer being connected between said plate and one of said grids, means for coupling the information bearing signal to the junction of said grid and said potentiometer, an output lead connecting to said movable contact on said potentiometer, a source of exclusively positive carrier pulses, and means for coupling said source to said other grid.

14. In a color television receiver, the combination including: means to receive a carrier wave of a given frequency and a given phase relative to the phase of a reference wave of said given frequency and having a fixed phase, said received carrier wave being modulated by an intelligence bearing signal and having an alternating current component and a direct current component; a source of a modulating wave having said given frequency and a desired phase relative to said given carrier wave phase and to said fixed reference wave phase; a modulator; means to impress said received carrier wave and said modulating wave concurrently upon said modulator so as to derive from said modulator at least a portion of said intelligence bearing signal including the alternating current component of said carrier wave; and means linearly bypassing said modulator to derive at least another portion of said intelligence bearing signal including the direct current component of said carrier wave.

15. In a color television receiver, the combination including: means to receive a carrier wave of a given frequency and a given phase relative to the phase of a reference wave of said given frequency and having a fixed phase, said received carrier wave being amplitude modulated by an intelligence bearing signal and having an alternating current component and a direct current component; a source of a modulating wave having said given frequency and said given phase; a modulator; means to impress said received carrier wave upon said modulator; means to impress said modulating wave upon said modulator; signal utilizing means to receive signals derived from said modulator; and means to linearly bypass the direct current component of said received carrier wave around said modulator to said signal utilizing means.

16. In a color television receiver, the combination including: means to receive a carrier wave of a given frequency and a given pase relative to a reference wave of said given frequency and having a fixed phase, said received carrier wave being amplitude modulated by an intelligence bearing signal and having an alternating current component and a direct current component; a source of a modulating wave having said given frequency and said given phase; a modulator to derive the alternating current component of said received carrier wave, said modulator having first and second inputs and an output; means coupling said carrier wave receiving means to said first modulator input to impress said carrier wave upon said modulator; means coupling said modulating wave source to said second modulator input to impress said modulating wave upon said modulator; and means coupling said first modulator input to said modulator output to linearly bypass the direct current component of said received carrier wave around said modulator.

17. In a color television receiver, the combination including: means to receive a carrier wave of a given frequency and a given phase relative to the phase of a reference wave of said given frequency and a fixed phase, said received carrier wave being modulated with an intelligence bearing signal so that said carrier wave has an alternating current component and a direct current component; a source of a modulating wave having said given frequency and said given phase; a modulator having input and output circuits; means coupling said carrier wave receiving means to an input circuit of said modulator to impress said received carrier wave upon said modulator in a given amplitude; means coupling said modulating wave source to an input circuit of said modulator to impress said modulating wave upon said modulator in an amplitude sufficiently greater than said given amplitude to produce in an output circuit of said modulator the alternating current component of said received carrier wave substantially exclusive of the direct current component of said received carrier wave; and means coupling said carrier wave receiving means to an output circuit of said modulator to linearly bypass the direct current component of said received carrier wave around said modulator.

18. In a color television receiver, the combination including: means to receive a carrier wave of a given frequency, said carrier wave being phase and amplitude modulated by intelligence bearing signals representing the colors of an object and having an alternating current component and a direct current component; a source of a reference wave having said given frequency and a fixed phase; means coupled to said reference wave source to produce modulating waves of said given frequency and having a plurality of respective phases relative to said fixed phase; a plurality of modulators, each having input and output circuits; means coupling said carrier wave receiving means to input circuits of all of said modulators to impress said received carrier wave upon said modulators; means coupling said modulating wave producing means to input circuits of all of said modulators to impress modulating waves of different phases respectively upon said modulators for producing in the output circuits of said modulators the alternating current components respectively of different phases of said received carrier wave; signal utilizing means coupled to the output circuits of said modulators; and means coupling said carrier wave receiving means to said signal utilizing means to bypass the direct current component of said received carrier wave around said modulators.

19. In a color television transmitter, the combination including: a source of a plurality of intelligence bearing signals representing the colors of an object; a source of a carrier wave having a given frequency and a fixed phase; means responsive to said carrier wave to produce a plurality of modulating waves of said given frequency and having a plurality of respective phases relative to said fixed phase; a plurality of modulators; means to impress said plurality of intelligence bearing signals respectively upon said modulators; means to impress said plurality of modulating waves respectively upon said modulators; signal combining means to produce a phase and amplitude modulated carrier wave of said given frequency from signals derived from said modulator; and means to bypass at least portions of said intelligence bearing signals around said modulators.

20. In a color television transmitter, the combination including: a source of a plurality of intelligence bearing signals representing the colors of an object; a source of a carrier wave having a given frequency and a fixed phase; means coupled to said carrier wave source to produce a plurality of modulating waves of said given frequency and having a plurality of respective phases relative to said fixed phase; a plurality of modulators, each having input and output circuits; means coupling said source of intelligence bearing signals to input circuits of said modulators to impress said plurality of intelligence bearing signals respectively upon said modulators; means coupling said modulating wave producing means to input circuits of said modulators to impress said plurality of differently phased modulating waves respectively upon said modulators; signal combining means coupled to the output circuits of said modulators to produce a composite phase and amplitude modulated carrier wave of said given frequency; and means coupling said source of intelligence bearing signals to said signal combining means to bypass at least portions of said intelligence bearing signals around said modulators.

References Cited in the file of this patent

UNITED STATES PATENTS

| | | |
|---|---|---|
| 2,273,548 | Weis | Feb. 17, 1942 |
| 2,285,164 | Kummerer | June 2, 1942 |
| 2,513,159 | Fredendall | June 27, 1950 |
| 2,525,089 | Blumlein | Oct. 10, 1950 |
| 2,541,076 | Labin | Feb. 13, 1951 |
| 2,575,047 | Crosby | Nov. 13, 1951 |
| 2,605,360 | Trevor | July 29, 1952 |

UNITED STATES PATENT OFFICE

Certificate of Correction

Patent No. 2,824,172

February 18, 1958

William H. Cherry

It is hereby certified that error appears in the printed specification of the above numbered patent requiring correction and that the said Letters Patent should read as corrected below.

In the drawings, Sheet 1, Figure 1, the lead line from the reference character "4" as indicated should be deleted and extended to the grid adjacent the cathode 8; a reference character —6— and lead line should be added to designate the electron tube including cathode 8; Figure 2, the legend "MULTIPLIER" in rectangles 28 and 36 should read —MODULATOR—; the legend "GENERAL" in rectangle 34 should read —GENERATOR—; same Sheet 1, lower right-hand corner thereof, name of inventor, for "Willam H. Cherry" read —William H. Cherry—; Sheet 2, Figure 3, the reference character "52" should read —53—; the reference character "88" should read —58—; Figure 4, potentiometers should be inserted in the lines leading from the "SOURCE OF INTELLIGENCE BEARING SIGNALS 118" to the lines 146 and 156; Sheet 3, Figure 5, the legends — +V— and — −V— should be added to the lines leading from the "SOURCE OF INTELLIGENCE BEARING SIGNAL 160"; the legend "BEARRING" in rectangle 160 should read —BEARING—; Sheet 4, containing Figures 6 and 7 should be canceled and the sheet as shown below should be substituted therefor.

Feb. 18, 1958 W. H. CHERRY 2,824,172

SAMPLING APPARATUS

Filed Aug. 14, 1950 4 Sheets-Sheet 4

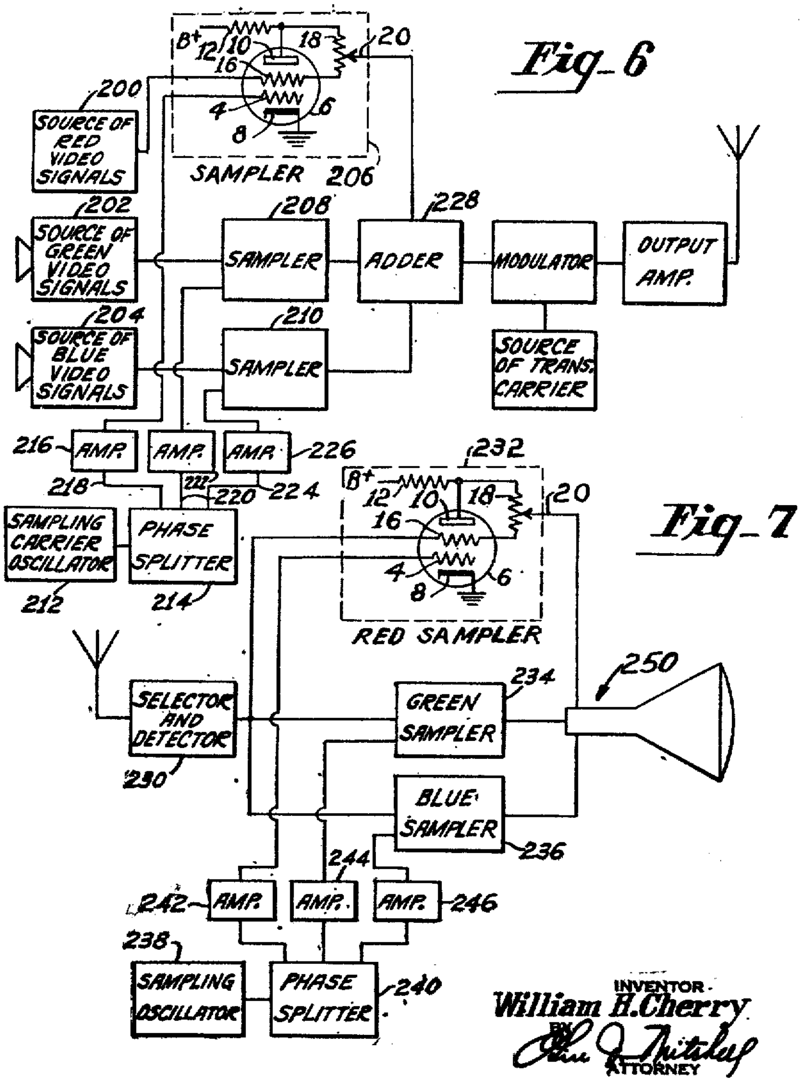

Fig. 6, Fig. 7

INVENTOR.
William H. Cherry
BY
ATTORNEY

Signed and sealed this 27th day of May 1958.

[SEAL]

Attest:
KARL H. AXLINE,
*Attesting Officer.*

ROBERT C. WATSON,
*Commissioner of Patents.*